(12) United States Patent
Urasawa et al.

(10) Patent No.: US 9,371,906 B2
(45) Date of Patent: Jun. 21, 2016

(54) SHIFT CONTROL SYSTEM FOR AUTOMATIC TRANSMISSION

(71) Applicant: Nissan Motor Co., Ltd., Kanagawa (JP)

(72) Inventors: Toru Urasawa, Kanagawa (JP); Yutaka Kawamoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/768,655

(22) PCT Filed: Feb. 13, 2014

(86) PCT No.: PCT/JP2014/053240
§ 371 (c)(1),
(2) Date: Aug. 18, 2015

(87) PCT Pub. No.: WO2014/126119
PCT Pub. Date: Aug. 21, 2014

(65) Prior Publication Data
US 2015/0377351 A1 Dec. 31, 2015

(30) Foreign Application Priority Data

Feb. 18, 2013 (JP) .................................. 2013-028626

(51) Int. Cl.
*F16H 61/48* (2006.01)
*F16H 59/14* (2006.01)
(Continued)

(52) U.S. Cl.
CPC .......... *F16H 61/66259* (2013.01); *F16H 59/14* (2013.01); *F16H 59/42* (2013.01); *F16H 59/46* (2013.01); *F16H 59/78* (2013.01);
(Continued)

(58) Field of Classification Search
None
See application file for complete search history.

(56) References Cited

U.S. PATENT DOCUMENTS 5,637,052 A * 6/1997 Hirota ..................... F16H 1/143
477/11
6,317,670 B1 * 11/2001 Okada ..................... F16H 59/14
477/107

(Continued)

FOREIGN PATENT DOCUMENTS

| JP | H10-103493 A | 4/1998 |
|----|--------------|--------|
| JP | 11-287317 A | 10/1999 |
| JP | 2005-147238 A | 6/2005 |
| JP | 2008-275000 A | 11/2008 |

OTHER PUBLICATIONS

Written Opinion issued in corresponding application No. PCT/JP2014/053240 mailed May 27, 2014 (7 pages).

*Primary Examiner* — Jacob S Scott
(74) *Attorney, Agent, or Firm* — Osha Liang LLP (57) ABSTRACT

A shift control device for shift controlling an automatic transmission in a powertrain drivingly connecting a power source, a hydraulic transmission element, and an automatic transmission in the mentioned order, has a hydraulic transmission element required output calculator that calculates a required output to be output from the hydraulic transmission element to the automatic transmission based on the output of the power source obtained from the slip condition between the input and output elements of the hydraulic transmission element and a total efficiency of the hydraulic transmission element, and a hydraulic transmission element total efficiency calculator that calculates, for each output rotation speed of the hydraulic transmission element, a speed ratio and a torque ratio between the input and output elements of the hydraulic transmission element, each being required for achieving the calculated hydraulic transmission element required output.

11 Claims, 6 Drawing Sheets (51) Int. Cl.
*F16H 59/42* (2006.01)
*F16H 59/46* (2006.01)
*F16H 59/78* (2006.01)
*F16H 61/662* (2006.01)
*F16H 61/00* (2006.01)

(52) U.S. Cl.
CPC ............ *F16H61/0021* (2013.01); *F16H 61/48* (2013.01); *F16H 61/66227* (2013.01); *F16H 61/66272* (2013.01); *F16H 2059/147* (2013.01); *F16H 2059/467* (2013.01)

(56) References Cited

U.S. PATENT DOCUMENTS

| | | | |
|---|---|---|---|
| 6,454,676 B1 * | 9/2002 | Date | F16H 61/66 477/120 |
| 2004/0254047 A1 * | 12/2004 | Frank | F16H 61/66254 477/37 |
| 2011/0196586 A1 * | 8/2011 | Inoue | F16H 59/46 701/58 |
| 2014/0128217 A1 * | 5/2014 | Tabata | B60K 6/445 477/5 |

* cited by examiner

SHIFT CONTROL SYSTEM FOR AUTOMATIC TRANSMISSION

BACKGROUND

1. Technical Field

The present invention relates to a shift control device not only for a belt type continuously variable transmission CVT and a toroidal-type continuously variable transmission but also for an automatic transmission including a stepped automatic transmission.

2. Related Art

In a conventional powertrain containing an automatic transmission, a power source such as an engine, a hydraulic transmission element such as a torque converter, and the automatic transmission are connected in these order.

When executing the shift control of the automatic transmission in the powertrain, on the basis of the shift lines which are preset in advance while considering power performance and fuel consumption, a target input speed of the transmission is determined from an accelerator opening and a vehicle speed, and the shift control is executed such that the target input speed of the transmission is achieved, i.e., an actual gear ratio or speed ratio matches a target speed ration which is obtainable by dividing the transmission target input speed by the transmission output rotation speed (vehicle speed).

Meanwhile, the planned shift lines described above is not a universal due to setting the same having the common driving in mind. Thus, in some cases, change in the planned shift lines are required to be executed based on a modified shift line.

Conventionally, a shift or transmission control technique based on the modified shift line has been proposed in Patent Document 1 for example.

The proposed technique addresses a drive or powertrain having an engine, a torque converter, and a continuously variable transmission arranged in the mentioned order, when a large engine braking request is generated during a running state in which the torque converter cannot be locked up (directly connecting the input and output elements) such as in a cold engine operation. In that situation, in place of the shift control based on the planned shift line of the automatic transmission, by changing the shift line, a compulsory downshift in the low gear shift is carried out to thereby realize an engine brake demand of the driver.

Patent Document 1: JP 10-103493 A

SUMMARY

However, irrespective of the purposes for changing the shift lines such as for the engine brake compensation as described in Patent Document 1, the shift control of the automatic transmission is done only having the purpose of achieving change in the shift lines. Thus, the changed shift schedule may lead to deterioration in significant fuel economy as compared to the shift control based on the planned shift line, resulting in bad fuel economy.

A shift control device for an automatic transmission according to one or more embodiments of the present invention may perform a shift control without causing deterioration of fuel consumption, i.e., without sacrificing fuel economy even when the shift control does not use the planned shift line.

First, a description is given of a shift control device for an automatic transmission according to one or more embodiments of the present invention. One or more embodiments of the present invention shifts control of an automatic transmission in a powertrain of power source, a hydraulic transmission element and an automatic transmission drivingly connected in the named order.

A shift control device according to one or more embodiments of the present invention comprises a hydraulic transmission element required output calculator, a fluid transmission element overall efficiency calculator, a power source efficiency calculator, and a powertrain efficiency calculator.

The hydraulic transmission element required output calculator according to one or more embodiments of the present invention calculates a required output to be output from the hydraulic transmission element to the automatic transmission based on the output of the power source obtained from the slip condition between the input and output elements of the hydraulic transmission element and a total efficiency of the hydraulic transmission element.

Further, the hydraulic transmission element total efficiency calculator according to one or more embodiments of the present invention calculates a speed ratio and a torque ratio between the input and output elements of the hydraulic transmission element representing the hydraulic transmission element required output for each output rotation speed, to thereby calculate the hydraulic transmission element total efficiency based on these speed ratio and the torque ratio for each output rotation speed.

Further, the power source efficiency calculator according to one or more embodiments of the present invention, in addition to obtaining a power source rotation speed of the power source required for achieving the hydraulic transmission elements required output for each output rotation speed of the hydraulic transmission element, calculates the efficiency of the power source required for achieving the hydraulic transmission element required output for each output speed of the hydraulic transmission element from the power source rotation speed and the power source output torque obtained based on the slip condition between the input and output elements of the hydraulic transmission element.

Further, the drive or powertrain efficiency calculator is provided to obtain powertrain efficiency for each output rotation speed of the hydraulic transmission element by multiplying the hydraulic transmission element total efficiency and the power source efficiency.

The shift control device according to one or more embodiments of the present invention shift controls the automatic transmission by setting an output speed of the hydraulic transmission element at which the powertrain efficiency obtained in the powertrain efficiency calculator described above reaches the highest as the target input rotation speed of the automatic transmission.

In the shift control device for an automatic transmission according to one or more embodiments of the present invention, the total efficiency of the hydraulic transmission element and the power source efficiency required for achieving a hydraulic transmission element required output according to the current driving state are obtained for each output rotation speed of the hydraulic transmission element. Then, the shift control is executed by setting, as a target input rotation speed to the automatic transmission, an output speed of the hydraulic transmission element at which the powertrain efficiency is the highest, which in turn is obtained by the multiplication of the hydraulic transmission element total efficiency and the power source efficiency.

Thus, it is now possible to achieve the hydraulic transmission element required output under shift control in which the overall efficiency of the powertrain is the highest in consideration of both the hydraulic transmission element efficiency and the power source efficiency. Therefore, even when executing to shift the automatic transmission out of the planned or scheduled shift line, the shift control may be performed without involving deterioration in fuel economy and without sacrificing fuel economy.

DETAILED DESCRIPTION

Below, a description will be given of embodiments of the present invention with reference to accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
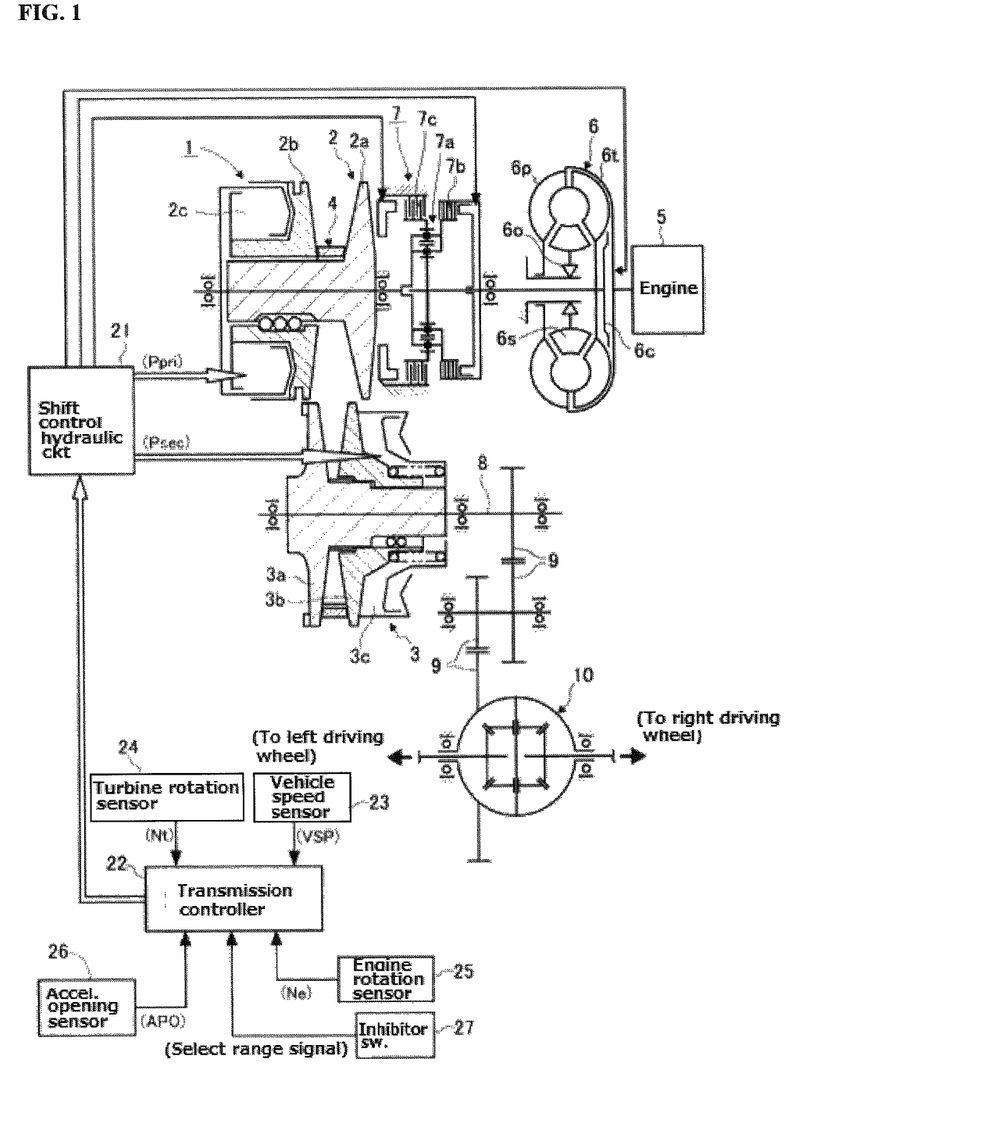
FIG. 1 is a system diagram schematically shown with a control system thereof for a powertrain of a vehicle equipped with a belt-type continuously variable transmission as an example.

FIG. 1 is a schematic diagram of a powertrain for a belt-type continuously variable transmission equipped vehicle including a shift control device according to one or more embodiments of the present invention along with its control system, wherein the bolt-type CVT is shown by reference numeral 1.

The belt-type continuously variable transmission 1 is composed of a primary pulley 2 and a secondary pulley 3 with both pulley V grooves thereof being aligned in the axis-perpendicular plane. An endless belt 4 is wound around and passes over the V-grooves of the pulleys 2 and 3.

Coaxially with the primary pulley 2, an engine 5 is disposed as a power source. Between the engine 5 and the primary pulley 2, a torque converter 6 and a forward-reverse switching mechanism 7 are respectively interposed in the mentioned order from the side of the engine 5.

The torque converter 6 corresponds to a hydraulic transmission element according to one or more embodiments of the present invention and couples an input element, i.e. a pump impeller 6p to the engine 5.

When the pump impeller 6p is rotated by the engine drive, working fluid under the centrifugal force in the torque converter, after striking the turbine runner 6t as an output element, returns to the pump impeller 6p through the stator 6s, so as to hydraulically drive a turbine runner 6t while absorbing the torque fluctuation.

During this time, a stator 6s that is placed on the fixed shaft via a one-way clutch 6o functions as a reaction element so that the turbine runner 6t can be hydraulically driven under increased torque.

In addition, the torque converter 6 is formed in a lock-up torque converter that may be placed in the lockup state in which the turbine runner 6t and the pump impeller 6p are directly coupled by engagement of the lockup clutch 6c.

Needless to say, the torque converter 6 does not exhibit the above-mentioned torque increasing function in a lock-up state by engagement of the lockup clutch 6c.

The forward-reverse switching mechanism 7 is configured by a double-pinion planetary gear set 7a as a main component and allows its sun gear to be coupled to the turbine runner 6t while allowing an output rotation from the torque converter 6 to be introduced.

Further, in the forward-reverse switching mechanism 7, a carrier of the double-pinion planetary gear set 7a is coupled to the primary pulley 2, and a forward clutch 7b directly coupling the sun gear and carrier of the double-pinion planetary gear set 7a and a reverse brake 7c fixing a ring gear of the double-pinion planetary gear set 7a are provided respectively.

Thus, the forward-reverse switching mechanism 7 is placed in a neutral state with both the forward clutch 7b and the reverse brake 7c released so that the engine rotation will not be transmitted to the primary pulley 2.

When engaging the forward clutch 7 in this state, the engine rotation may be directly transmitted from the engine 5 via the torque converter 6 to the primary pulley 2 as the forward rotation.

The rotation to the primary pulley 2 is transmitted through the belt 4 to secondary pulley 3, and the rotation of the secondary pulley 3 is then transferred through an output shaft 8 attached to the secondary pulley 3, a final reduction gear unit 9 and a differential gear unit 10 to left and right drive wheels (not shown) to serve to propel the vehicle.

To enable changing the pulley rotation ratio (gear or speed ratio) between the primary pulley 2 and secondary pulley 3 during the power transfer, one of the opposite sheave to form a V-groove of the primary pulley 2 and secondary pulley 3 is defined as a stationary or fixed sheave 2a, 3a, while the other sheave 2b, 3b is defined as movable sheave displaceable in the axial direction.

These movable sheaves 2b, 3b, respectively, are biased toward the stationary sheaves 2a, 3a by providing a primary pulley pressure Ppr1 and a secondary pulley pressure Ppr2 respectively to a primary pulley chamber 2c and a secondary pulley chamber 3c, respectively.

Thus, the belt 4 is pressurized between the opposing sheaves 2a, 2b:3a, 3b to enable power transmission between the primary pulley 2 and the secondary pulley 3.

While allowing the movable sheave 2b of the primary pulley 2 to approach the fixed sheave 2a to narrow the pulley V-groove width, when increasing the pulley V-groove width by moving the movable sheave 3b of the secondary pulley 3 away from the fixed sheave 3a at the same time, the endless V-belt 4 will be caused to be wound around the primary pulley 2 with an increasing winding diameter with the winding diameter for the secondary pulley 3 on the decrease. Thus, the continuously variable transmission 1 may be continuously upshifted from the lowest transmission or speed ratio shown in FIG. 1 to the highest speed ratio selected state (not shown).

Conversely, while allowing the movable sheave 2b of the primary pulley 2 to move away from the fixed sheave 2a to widen the pulley V-groove width, when narrowing the pulley V-groove width by bringing the movable sheave 3b of the secondary pulley 3 closer to the fixed sheave 3a, the endless V-belt 4 will be caused to be wound around the primary pulley 2 with an decreased winding diameter with the winding diameter for the secondary pulley 3 on the increase. Thus, the continuously variable transmission 1 may be continuously downshifted from the highest transmission or speed ratio (not shown) to the lowest speed ratio selected state shown in FIG. 1.

<Shift Control System>

In the shift control of the belt type continuously variable transmission 1, a line pressure to be controlled as described below serves as a source pressure, and a differential pressure between a secondary pulley pressure Psec generated depending on a target speed ratio and a primary pulley pressure Ppri using the line pressure unmodified is applied to change the V-groove width of both pulleys 2,3 to thereby change the wound diameters of belt wound around these pulleys 2, 3 will be changed step less to achieve the target speed ratio.

The outputs of the primary pulley pressure Ppri and secondary pulley pressure Psec are controlled by a shift control hydraulic circuit 21 which also controls an output for the engaging hydraulic pressure of the forward clutch 7b to be engaged at the selection of the forward driving range, an output of the engaging hydraulic pressure of the reverse clutch 7c at the selection of the reverse driving range, and an output of an engaging hydraulic pressure of the lock up clutch 6c to be concluded at the time of lock-up operation of the torque converter.

The shift control hydraulic pressure circuit 21 is assumed to be responsive to a signal from the transmission controller 22 to perform the control.

Therefore, the transmission controller 22 receives a signal from a vehicle speed sensor 23 for detecting a vehicle speed VSP, a signal from a turbine speed sensor 24 for detecting the rotation speed of the turbine runner 6t (turbine speed which is the output rotation of the torque converter 6) Nt, a signal from an engine rotation speed sensor 25 for detecting an engine speed Ne representing an input rotation to the torque converter 6, a signal from an accelerator opening sensor 26 for detecting the accelerator pedal depression amount (accelerator opening) APO, and a signal from an inhibitor switch 27 for detecting a selected range position of the continuously variable transmission 1.

<Shift Control>

The transmission controller 22 in one or more embodiments of the present invention, based on various types of input information mentioned above, executes the program in FIG. 2, to perform a shift control of continuously variable transmission 1 as described below.

Note that, though not shown in FIG. 2, the transmission controller 22 shown in FIG. 2, depending on the selected range signal from the inhibitor switch 27, brings the continuously variable transmission 1 to the selected range corresponding to the condition as detailed below.

While the non-driving range such as P (parking) range or N (vehicle stop) range is selected, the transmission controller 22 does not supply the engagement oil pressure from the shift control hydraulic circuit 21 to the forward clutch 7b and reverse brake 7c, The continuously variable transmission 1 is place in a neutral state in which power transmission is not performed by releasing the forward clutch 7b and the reverse brake 7c.

While a forward travel range such as D range is selected, the transmission controller 22, by supplying the engagement pressure from the shift control hydraulic circuit 21 only in the forward clutch 7b for engagement, brings the continuously variable transmission 1 in a forward rotational (positive rotation) transmission state.

During a period in which a reverse driving range such as the R-range is selected, the transmission controller 22, by supplying the engagement pressure from the shift control hydraulic circuit 21 only in the reverse brake 7c for engagement, brings the continuously variable transmission 1 to a reverse rotation transmission state.

Figure 2:
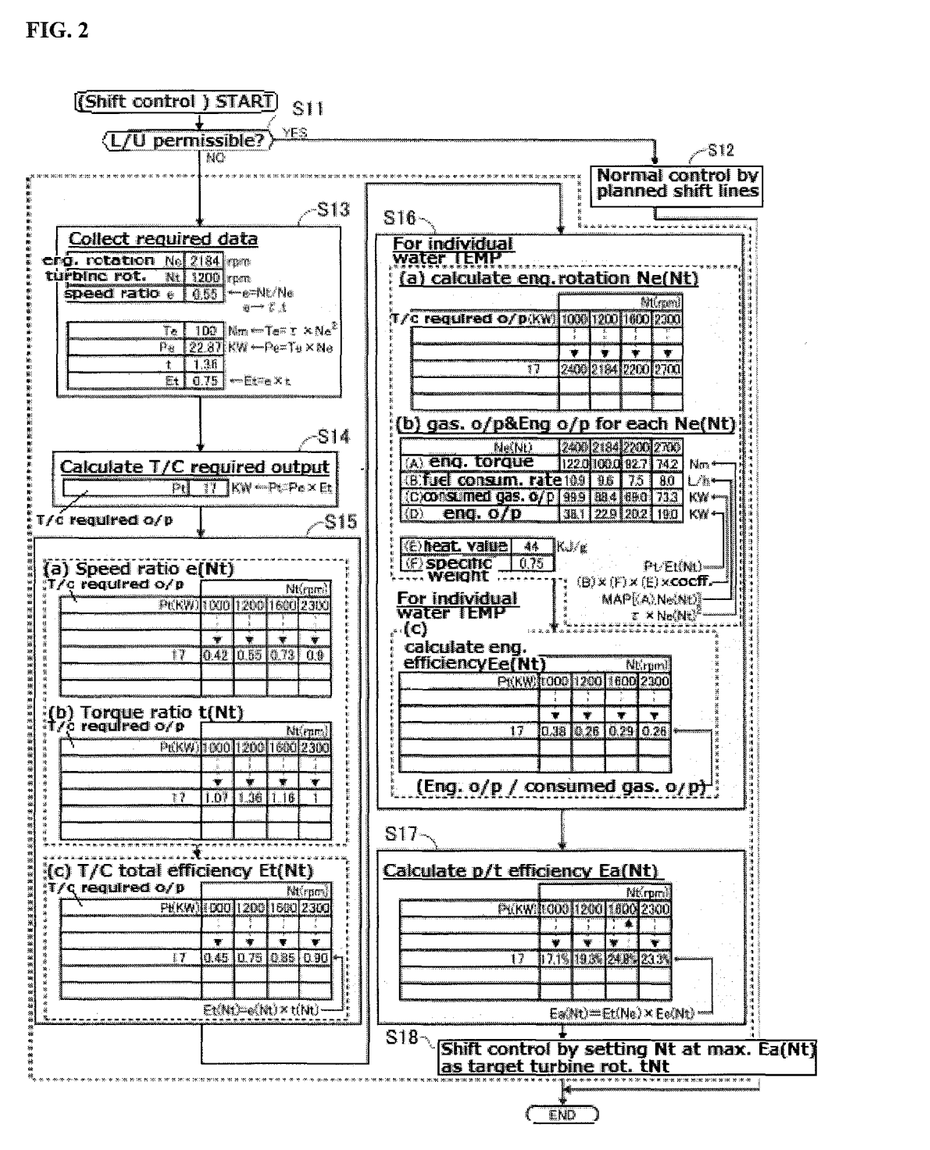
FIG. 2 is a flowchart showing a shift control program executed by a transmission controller of FIG. 1.

The shift control program of FIG. 2 shows a state in which, during the forward drive range, the transmission controller 22 holds the continuously variable transmission 1 in a forward rotation transmission state by engaging the forward clutch 7b.

In step S11 in FIG. 2, it is checked whether or not the lock-up of the torque converter 6 is permissible. The lock-up permission conditions may be, for example, a post-warm-up operation and at a high-rotation speed with low torque region where the torque fluctuation absorbing function of the torque converter 6 is unnecessary.

If it is determined that the lock-up permission state is present in step S11, the transmission controller 22, responsive to the determination result, supplies a hydraulic pressure from the shift control hydraulic circuit 21 to the lock up clutch 6c to engage the lock-up clutch 6c so thereby 6p and 6t of the torque converter 6 are directly coupled, and control proceeds to step S12.

In this step S12, a normal shift control is primarily performed based on the planned shift line.

More specifically, relying on the planned shift line, based on a vehicle speed VSP and an accelerator opening APO, a target input rotation speed of the continuously variable transmission 1 is obtained, and by dividing the target transmission input rotation speed by a rotation speed of the secondary pulley 3 (obtainable from the current vehicle speed VSP) to calculate a target speed ratio. Then, by supplying the primary pulley pressure Ppr1 and the secondary pulley pressure Psec corresponding to the target speed ratio to the primary pulley chamber 2c and the secondary pulley chamber 3c respectively from the shift control circuit 31, the continuously variable transmission 1 is subject to shift toward the target speed ratio.

In step S11, when it is determined that the lock-up permission state is unavailable due to cold engine operation, for example, the transmission controller 22, responsive to the determination result, does not supply a hydraulic pressure to the lock-up clutch 6c from the shift control hydraulic circuit 21 and brings the torque converter 6 in a converter state in which the input and output elements 6t, 6p of the torque converter 6 are released from direct coupling due to release of the lock-up clutch 6c, and control proceeds to steps S13 to S18. Then, according to the process shown in the block diagram in FIG. 3, a target turbine rotation speed tNt is obtained by the process shown in the block diagram in FIG. 3 so that the continuously variable transmission 1 is shift controlled to achieve the target turbine rotation speed tNt under the current vehicle speed VSP.

A description is given below of the method of determining the target turbine rotation speed tNt in steps S13 to S18 with reference to the block diagram of FIG. 3, as well.

Figure 3:
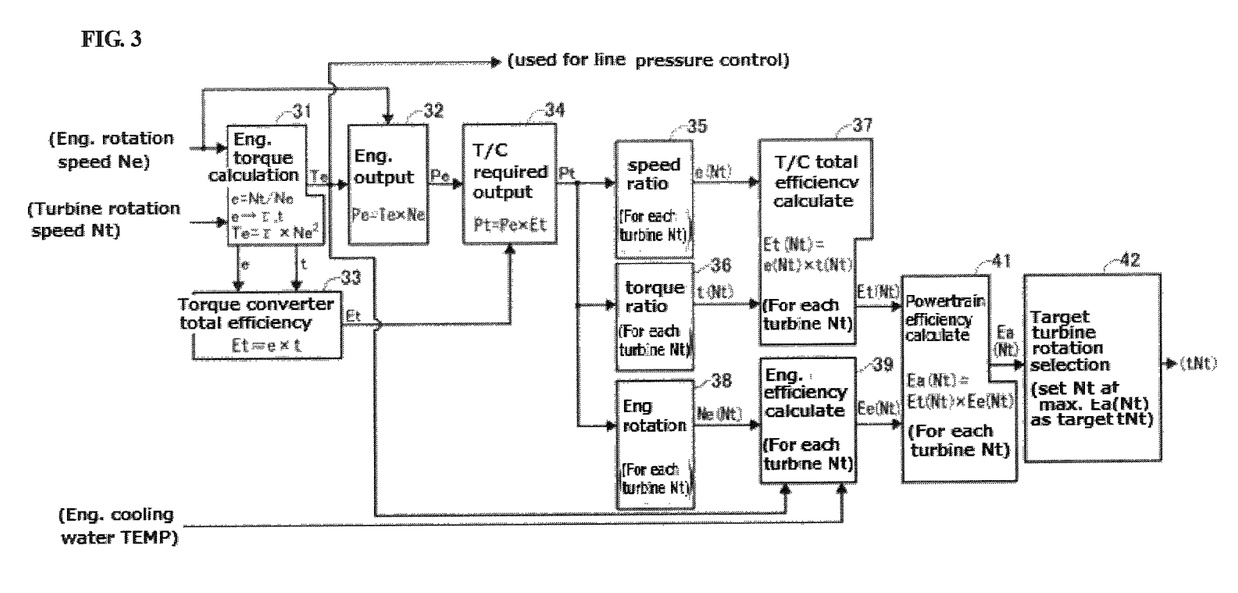
FIG. 3 is an explanatory view showing a program part for determining a target turbine speed in a form of functional block diagrams.
Figure 4:
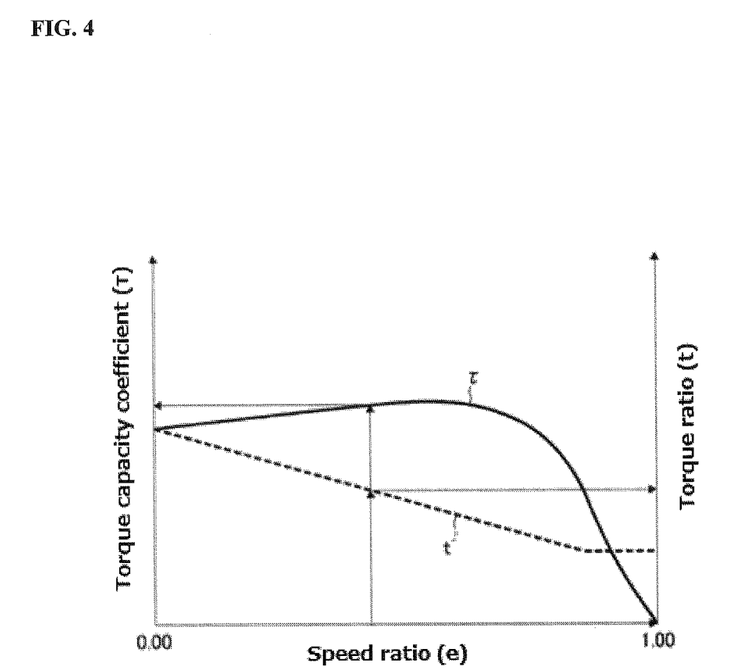
FIG. 4 is a performance diagram of the torque converter.

In step S13, the process first reads an engine speed Ne (2184 rpm) and a turbine speed Nt (1200 rpm), and as shown in the engine torque calculating section 31 in FIG. 3, based on the engine rotation speed Ne and the turbine rotation speed Nt, an actual speed ratio e of the torque converter 6 is calculated by the equation, e=Nt/Ne (e=0.55). Based on the actual speed ratio e (0.55), reference is made to the performance diagram of the torque converter 6, as exemplified in FIG. 4, and a current torque capacity coefficient T and a current torque ratio t of the torque converter 6.

Further, in step S13 (engine torque calculation section 31), the output torque (engine torque) Te of engine 5 is calculated by the equation, $Te = \tau \times Ne^2$ (Te=100 Nm).

Numerical examples shown in steps S13 to step S17 in FIG. 2 are those with the torque converter 6 being in a non-lockup state in the engine cold operation at an accelerator opening APO, 10 degrees and at the vehicle speed, VSP, 20 km/h.

Although a sensor detection value of the engine torque Te at this time was at 116 Nm, since the value is unreliable due to the engine cold operation, the sensor detection value of the engine torque Te (116 Nm) in one or more embodiments of the present invention was not used. Instead, by using the engine torque Te=100 Nm obtained in step S13 (engine torque calculation section 31), the shift control will be performed as described below.

Note that the engine torque Te, 100 Nm obtained by calculation in step S13 (engine torque calculating section 31), as shown in FIG. 3, serves also as a control of the line pressure for using a transmission control source pressure for performing the shift control of the continuously variable transmission 1. By setting the line pressure to a pressure corresponding to the engine torque calculated value Te (100 Nm), the line pressure may be set to a minimum pressure value with which no slip in the continuously variable transmission occurs so that the transmission efficiency of the continuously variable transmission 1 may be enhanced while keeping the energy loss to the minimum.

Furthermore, in step S13, as shown in the engine output calculation section 32 in FIG. 3, the output Pe (power) of the engine 5 is calculate by an equation, Pe=Te×Ne (Pe=22.87 kw).

Still further in step S13, as shown in the torque converter total efficiency calculation unit 33 in FIG. 3, a torque converter total efficiency Et is obtained by an equation, Et=e×t, based on the speed ratio e and the torque ratio t (Et=0.75).

In the next step S14, as in the torque converter required output calculation section 34 in FIG. 3, the required output Pt of the torque converter 6 is obtained by multiplying the engine output Pe and the torque converter total efficiency Et, i.e., Pt=Pe×Et (Pt=17 KW).

The torque converter required output Pt represents the power required for the driving operation the driver desires in the current operating conditions to achieve the running, which is constant despite change in the engine speed Ne or engine torque Te.

Therefore, the step S14 corresponds to the hydraulic transmission element required output calculator in one or more embodiments of the present invention.

In the next step S15, as shown in (a), first, by the calculation of the speed ratio calculation section 35 in FIG. 3, a speed ratio e (Nt) is obtained for each turbine rotation speed (Nt) of the torque converter 6 required for achieving the required output Pt (17 kW) of the torque converter 6.

When obtaining such a torque converter output achieving speed ratio e(Nt) for each turbine speed Nt, it is preferable to previously calculate the speed ratio e (Nt) for each turbine rotation speed and subsequently map the speed ratio e (Not) previously calculated for each turbine speed Nt to obtain by a map search The is preferred in the sense to reduce the calculation load.

Further, in step S15, as shown in (b), by calculation in the torque ratio calculation section 36 in FIG. 3, for each turbine speed Nt of the torque converter 6, a torque ratio t (Nt) needed to achieve the torque converter required output Pt (17 KW) is obtained. Also, when obtaining such a torque converter required output achieving torque ratio t(Nt), is preferable to previously calculate and map the torque ratio t(Nt) with respect to each turbine rotation speed Nt for each turbine rotation speed Nt, for map search to thereby reduce the calculation load.

Further in step S15, as shown in (c) and also as shown in the torque converter total efficiency calculation section 37 in FIG. 3, for each turbine rotation of the torque converter 6, the total efficiency Et(Nt) required for achieving the torque converter required output Pt (17 kW) is obtained by calculation of Et(Nt)=e(Nt)×t(Nt).

Thus, the step S15 corresponds to the hydraulic transmission element total efficiency calculator in one or more embodiments of the present invention.

Figure 5:
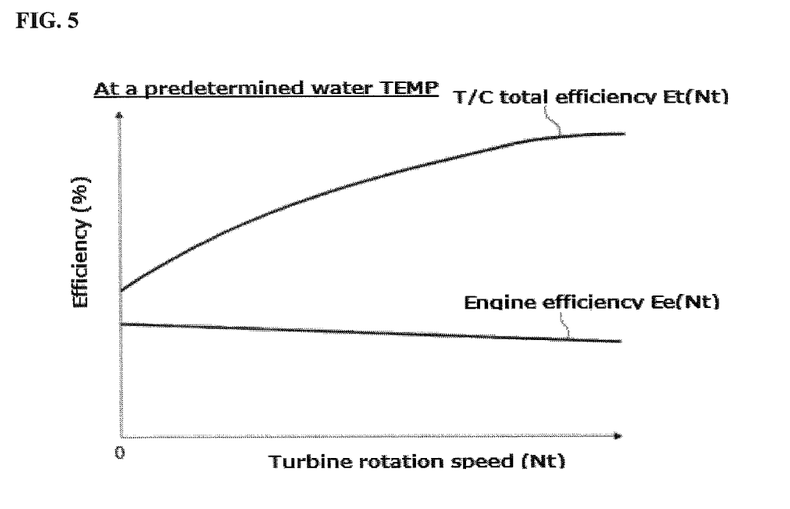
FIG. 5 is a characteristic diagram showing the variation characteristic of the torque converter total efficiency and engine efficiency obtained in FIGS. 1, 2.

Such a torque converter required output achieving total efficiency Et(Nt) for each turbine rotation speed Nt is indicated by the solid line in FIG. 5. It is preferable to calculate and map this relationship previously by the calculation described above for a map search.

In the next step S16, as shown in (a), first, by calculation in the engine rotation speed computing section 38 in FIG. 3, for each turbine speed Nt, an engine rotation speed Ne(Nt) is obtained for achieving the torque converter required output Pt (17 kW).

When obtaining the torque converter required output achieving engine rotation speed Ne(Nt) for each turbine rotation speed Nt, it is preferable to calculate and map the engine rotation speed Ne(Nt) for each turbine rotation speed Nt for map search.

Further, in step S16, as shown in (b) and (c), by the calculation in the engine efficiency calculation section 39 in FIG. 3, for each turbine speed Nt, the engine efficiency Ee(Nt) required for achieving the torque converter required output Pt (17 kW) is obtained as follows.

First, as shown in step S16 (b), for each of the engine speed Ne (Nt), the engine torque required for achieving the torque converter required output Pt (17 KW) is calculated by an expression; τ×Ne (Nt), then, with reference to an engine characteristics map based on the engine torque (τ×Ne (Nt)) and the engine rotation speed Ne (Nt), the fuel consumption rate is map searched.

Then, by multiplying the fuel consumption rate, fuel (gasoline) specific gravity 0.75, fuel (gasoline) amount of heat 44 KJ/g, unit conversion factor of fuel (gasoline) with the fuel (gasoline), a fuel (gasoline) output representing a work rate of fuel (gasoline) to be consumed. Further, by the calculation to divide the converter required output Pt (17 kW) by the torque converter total efficiency Et(Nt), an engine output (Pt (17 kW)/Et(Nt)) is obtained.

Then, as shown in step S16 (c), for each turbine rotation speed Nt (engine rotation speed Ne(Nt)), an engine efficiency Ee (Nt) is calculated required for achieving the torque converter required output Pt (17 kW).

Thus, the step S16 corresponds to the power source efficiency calculator in one or more embodiments of the present invention.

When calculating the engine efficiency Ee (Nt), for each turbine speed Nt (engine speed Ne (Nt)), the engine efficiency Ee (Nt) may be obtained by dividing the engine output by consumed gasoline output.

The engine efficiency Ee (Nt) is indicated by a broken line in FIG. 5. It is preferable to calculate and map these previously for map search.

Note that the engine 1 undergoes change in the driving performance and fuel consumption depending on the coolant temperature TEMP, it is obvious to do the calculations described above in step S16 based on the individual engine coolant temperature (TEMP).

Needless to say, it is more advantageous that to do the calculation in step S16 such that the value obtained in advance by the calculation is mapped with respect to the cooling water temperature (TEMP) and to do the map search.

At this time, if a map corresponding to the engine cooling water temperature TEMP is not available, thus presenting an intermediate value between the adjacent maps, the engine efficiency Ee(Nt) may be obtained based on two searched values from the respective adjacent maps using linear interpolation.

In the next step S17, as shown in the powertrain efficiency calculating section 41 in FIG. 3, a powertrain efficiency Ea (Nt) for each turbine speed Nt required for achieving the torque converter required output Pt (17 KW) is calculated by the multiplication of the torque converter total efficiency Et(Nt) obtained in step S15 (calculating sections 34 to 36) and the engine efficiency Ee(Nt) obtained in step S16 (calculating sections 38, 39) according to the equation; {Ea (Nt)=Et(Nt)× Ee(Nt)}.

Thus, the step S17 corresponds to the powertrain efficiency calculator in one or more embodiments of the present invention.

Figure 6:
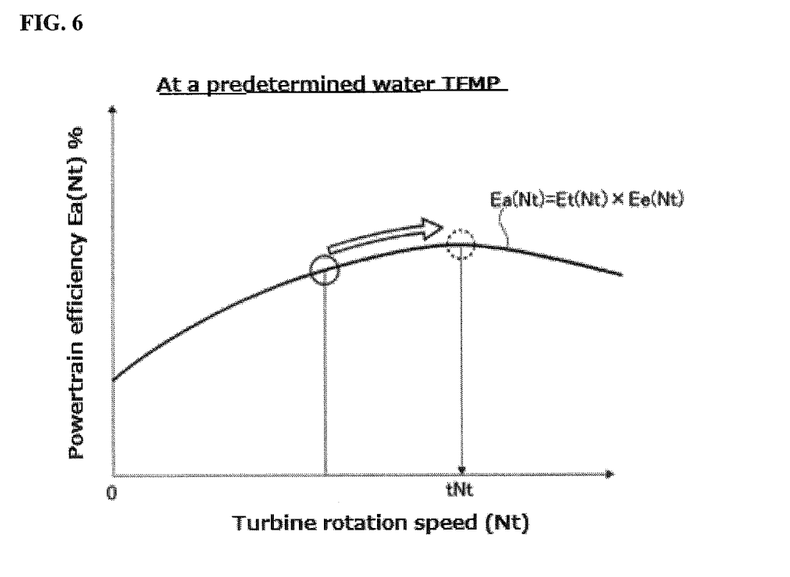
FIG. 6 is a characteristic diagram showing the variation characteristic of the powertrain efficiency is obtained in FIGS. 1, 2.

The powertrain efficiency Ea(Nt) for each turbine speed Nt is illustrated in FIG. 6. It may be possible to calculate and map these according to the calculations described above for obtaining through map search. However, the driving performance or the fuel consumption may vary depending on the engine cooling water temperature TEMP, the calculation for the powertrain efficiency is most effectively done on-line or in real-time.

In the next step S18, also shown in a target turbine rotation speed selecting section 42 in FIG. 3, a turbine rotation speed Nt at which the powertrain efficiency Ea (Nt) required for achieving the torque converter required output Pt (17 kW) for each turbine rotation speed Nt reaches the highest is identified as the a target turbine rotation speed tNt to offer for shift control (in step S17, the turbine rotation speed Nt=1600 rpm at which Ea(Nt) reaches the highest of 24.8%).

When executing the shift control, the transmission controller 22 in FIG. 1 obtains a target speed ratio by dividing the target turbine rotation speed tNt by the rotation speed of the secondary pulley 3 (as obtained from the current vehicle speed VSP), and by supplying a primary pulley pressure Ppri and a secondary pulley pressure Psec corresponding to the target speed ratio respectively to the primary pulley chamber 2c and the secondary pulley chamber 3c from the shift control hydraulic circuit 21, causes the continuously variable transmission 1 to be shifted from the current, actual speed ratio to the target speed ratio.

According to the shift control of one or more embodiments of the present invention, the torque converter total efficiency Et(Nt) and an engine efficiency Ee(Nt) required for achieving the required output Pt of the torque converter 6 according to the current driving state are obtained for each turbine rotation speed Nt representing the output rotation speed of the torque converter 6. Then, the shift control is executed by setting, as a target input rotation speed tNt to the automatic transmission, a turbine rotation speed at which a powertrain efficiency Ea(Nt) obtained by multiplying the torque converter total efficiency Et(Nt) and the engine efficiency Ee(Nt) reaches the highest.

Thus, it is now possible to achieve the torque converter required output Pt under shift control in which the total efficiency of the powertrain is the highest in consideration of both the torque converter efficiency and the engine efficiency, as shown by arrow in FIG. 6. Therefore, even when executing shift of the automatic transmission out of the planned shift line, the shift control may be performed without involving deterioration in fuel economy and without sacrificing fuel economy.

Moreover, in one or more embodiments of the present invention, the powertrain efficiency Ea(Nt) is obtained for separate engine cooling water temperatures TEMP to thereby serve as calculation of the powertrain efficiency Ea(Nt). Thus, even when the engine 1 operates differently in the driving performance or fuel consumption depending on the cooling water temperature, the above may be achieved reliably without being affected by the engine cooling water temperature TEMP.

Figure 7:
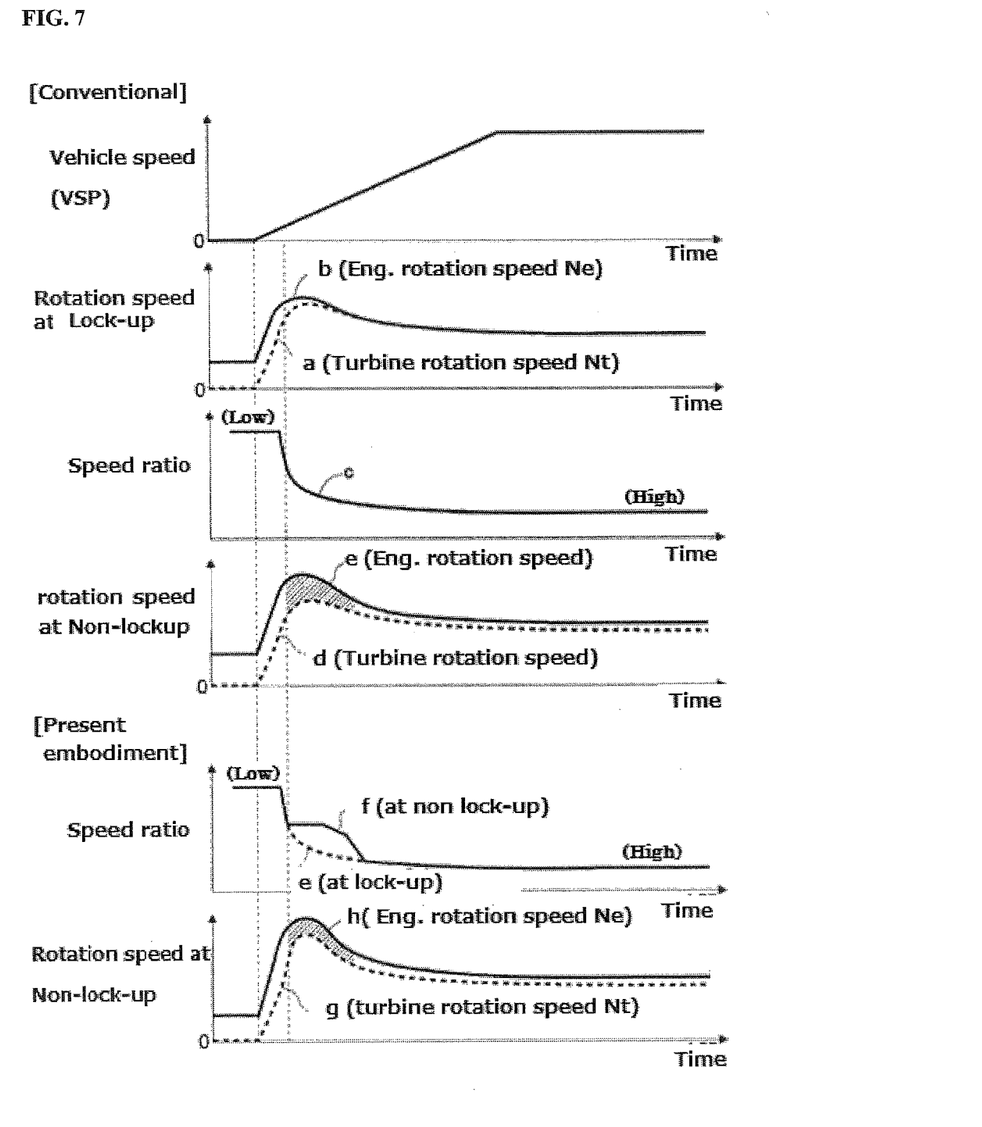
FIG. 7 is an operation time charge showing the shift control according to the embodiment shown in FIGS. 1 to 3 compared to a conventional shift control.

Additional description is given of the above with reference to FIG. 7.

FIG. 7 is a shift operation time chart at the time of starting acceleration in which the vehicle speed VSP rises as shown in the drawing.

When locking-up the torque converter 6, the engine rotation speed Ne changes as shown by the solid line b compared to the turbine rotation speed Nt shown by a broken line. Since the rotation speed difference between the turbine rotation speed Nt and the engine rotation speed Ne, i.e. slip rotation of the torque converter 6 is small and operates with good efficiency. The shift speed exhibits a change with time as shown by a solid line c.

Incidentally, in a driving condition in which the torque converter 6 is unable to be locked-up, addressed by one or more embodiments of the present invention as control area, conventionally, compared to the turbine rotation speed Nt indicated by a broken line d (the same as that indicated by a broken line a), the engine rotation speed changes as illustrated by a solid line e so as to exceed the engine rotation speed Ne indicated by the solid line b. Thus, because of the large slip rotation of the torque converter 6 representing a differential rotation speed between the turbine rotation speed Nt and the engine rotation speed Ne, the efficiency deteriorates.

In contrast, according to the above-mentioned shift control of one or more embodiments of the present invention, the speed ratio is configured to be changed to a target speed ratio, as shown by the solid line f in shift transient period, at which the powertrain efficiency Ea(Nt) reaches the highest.

Thus, compared to the turbine rotation speed Nt indicated by a broken line g (the same as those shown by the broken lines a, d), the engine rotation speed Ne undergoes change as shown by the solid line h to be decreased lower than the engine rotation speed Ne indicated by the solid line e. Thus, it is possible to make the slip rotation of the torque converter small representing a differential rotation between the turbine rotation speed Nt and the engine rotation speed Ne of gear ratio to thereby improve efficiency.

Incidentally, it has been confirmed that, in the same conditions as described per FIG. 2, in which the accelerator opening APO=10 degrees, the vehicle speed VSP=20 km/h (turbine speed Nt=1200 rpm), the engine speed Ne=2184 rpm, and the engine torque Te=100 Nm, by the shift control based on the conventionally planned or scheduled shift line, the fuel consumption rate is 9.6 L/h. However, according to the shift control in one or more embodiments of the present invention, by setting the target turbine rotation tNt=1600 rpm, the fuel consumption is improved to 7.5 L/h at an engine rotation speed Ne(Nt)=2200 rpm corresponding to Nt=1600 rpm so that 22% improvement has been achieved in fuel economy.

Incidentally, in one or more of the illustrated embodiments, the description is made in a case in which the automatic transmission is the continuously variable transmission. However, the concept of one or more embodiments of the present invention may be applicable to a stepped automatic transmission. However, in the case of the stepped automatic transmission, the resulting speed ratio may not be continuous. Thus, the target speed ratio which has been obtained from the target turbine rotation speed tNt may not match the selectable shift stage. In this case, it is obvious to execute shift control by using a shift stage closest to the target shift stage.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1 V-belt type continuously variable transmission (automatic transmission)
2 primary pulley
3 secondary pulley
4 V belt
5 engine (power source)
6 lock-up torque converter (hydraulic power transmission element)
7 forward-reverse switching mechanism
8 output shaft
9 final reduction gear pairs
10 differential gear
21 shift control hydraulic circuit
22 transmission controller
23 vehicle speed sensor
24 turbine speed sensor
25 engine speed sensor
26 accelerator sensor
27 inhibitor switch
29 engine rotation sensor
31 engine torque calculating section
32 engine output calculation section
33 torque converter total efficiency calculation section
34 torque converter required output calculation section
35 speed ratio calculation section
36 torque ratio calculation section
37 torque converter total efficiency calculation section
38 engine rotation speed calculation section
39 engine efficiency calculation section
41 powertrain efficiency calculation section
42 target turbine rotation speed selection section

The invention claimed is:

1. A shift control device for shift controlling an automatic transmission in a powertrain drivingly connecting a power source, a hydraulic transmission element, and an automatic transmission in order, comprising:
   a hydraulic transmission element required output calculator that calculates a required output to be output from the hydraulic transmission element to the automatic transmission based on the output of the power source obtained from the slip condition between the input and output elements of the hydraulic transmission element and a total efficiency of the hydraulic transmission element;
   a hydraulic transmission element total efficiency calculator that calculates, for each output rotation speed of the hydraulic transmission element, a speed ratio and a torque ratio between the input and output elements of the hydraulic transmission element, each being required for achieving the calculated hydraulic transmission element required output, to thereby calculate, for each output rotation speed of the hydraulic transmission element, the hydraulic transmission element total efficiency being based on the speed ratio and the torque ratio;
   a power source efficiency calculator that, in addition to obtaining a power source rotation speed of the power source required for achieving the hydraulic transmission elements required output for each output rotation speed of the hydraulic transmission element, calculates the efficiency of the power source required for achieving the hydraulic transmission element required output for each output speed of the hydraulic transmission element from the power source rotation speed and the power source output torque obtained based on the slip condition between the input and output elements of the hydraulic transmission element; and
   a powertrain efficiency calculator that obtains, for each output rotation speed of the hydraulic transmission element, a powertrain efficiency by the multiplication of the hydraulic transmission element total efficiency and the power source efficiency,
   wherein the shift control device sets, as a target input rotation to the automatic transmission, an output rotation speed at which the obtained powertrain efficiency is the highest.

2. The shift control device for an automatic transmission as claimed in claim 1, wherein the power source efficiency calculator calculates the efficiency of the power source required for achieving the hydraulic transmission element output for each temperature of the power source.

3. The shift control device for an automatic transmission as claimed in claim 1, wherein a shift control source pressure for use in the shift control of the automatic transmission is pressure regulated to a value corresponding to the output torque of the power source obtained based on the slip condition between the input and output elements of the hydraulic transmission element.

4. The shift control device for an automatic transmission as claimed in claim 1, wherein the powertrain efficiency calculator performs the calculation of the powertrain efficiency on-line.

5. The shift control device for an automatic transmission as claimed in claim 1, wherein, when a driving state is not found in a direct connection permissible state between the input and output elements of the hydraulic transmission element, the shift control sets, as the target input rotation to the automatic transmission, the output rotation speed of the hydraulic transmission element at which the powertrain efficiency is the highest.

6. The shift control device for an automatic transmission as claimed in claim 2, wherein a shift control source pressure for use in the shift control of the automatic transmission is pressure regulated to a value corresponding to the output torque of the power source obtained based on the slip condition between the input and output elements of the hydraulic transmission element.

7. The shift control device for an automatic transmission as claimed in claim 2, wherein the powertrain efficiency calculator performs the calculation of the powertrain efficiency on-line.

8. The shift control device for an automatic transmission as claimed in claim 3, wherein the powertrain efficiency calculator performs the calculation of the powertrain efficiency on-line.

9. The shift control device for an automatic transmission as claimed in claim 2, wherein, when a driving state is not found in a direct connection permissible state between the input and output elements of the hydraulic transmission element, the shift control sets, as the target input rotation to the automatic transmission, the output rotation speed of the hydraulic transmission element at which the powertrain efficiency is the highest.

10. The shift control device for an automatic transmission as claimed in claim 3, wherein, when a driving state is not found in a direct connection permissible state between the input and output elements of the hydraulic transmission element, the shift control sets, as the target input rotation to the automatic transmission, the output rotation speed of the hydraulic transmission element at which the powertrain efficiency is the highest.

11. The shift control device for an automatic transmission as claimed in claim 4, wherein, when a driving state is not found in a direct connection permissible state between the input and output elements of the hydraulic transmission element, the shift control sets, as the target input rotation to the automatic transmission, the output rotation speed of the hydraulic transmission element at which the powertrain efficiency is the highest.

* * * * *